Oct. 13, 1931.   J. A. SCHMITT   1,827,405
PULSATOR
Filed Oct. 15, 1928
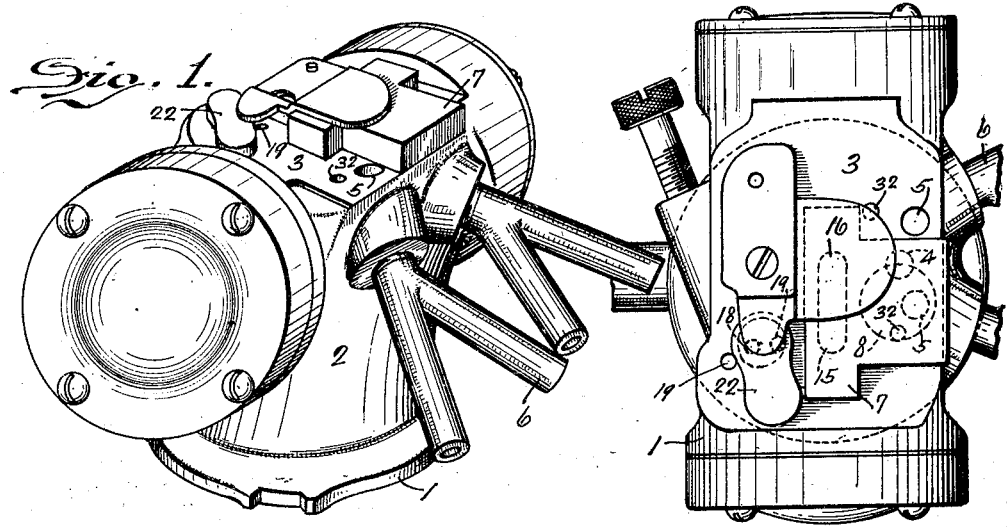
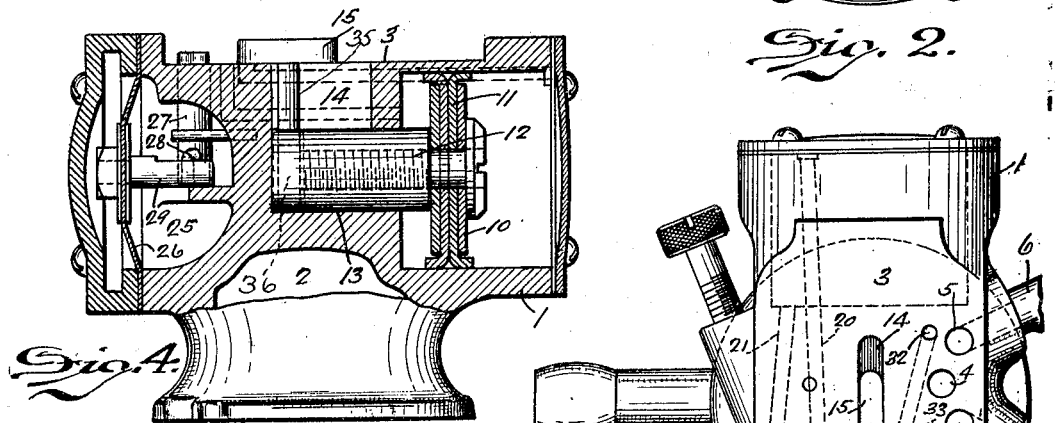
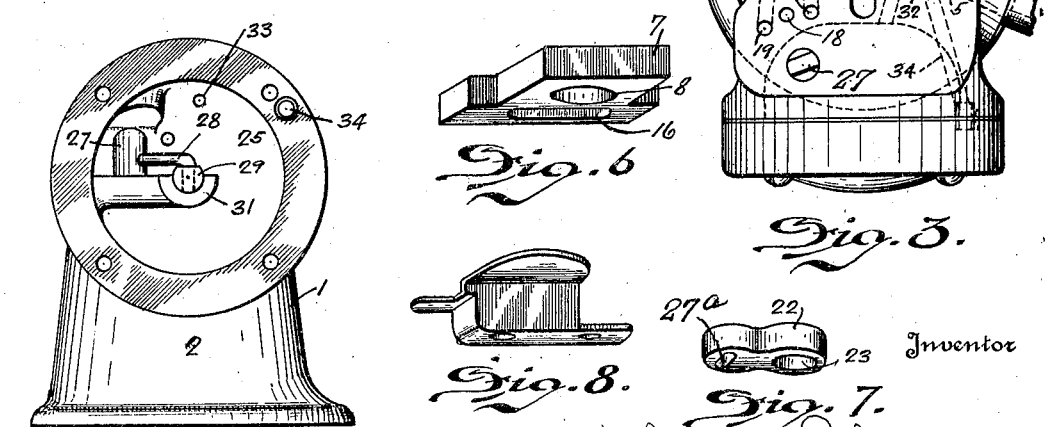
Inventor
John A. Schmitt
By F. L. Walker Attorney Patented Oct. 13, 1931

1,827,405

UNITED STATES PATENT OFFICE

JOHN A. SCHMITT, OF WAUKESHA, WISCONSIN, ASSIGNOR TO THE UNIVERSAL MILKING MACHINE COMPANY, OF WAUKESHA, WISCONSIN, A CORPORATION OF WISCONSIN

PULSATOR

Application filed October 15, 1928. Serial No. 312,545.

This invention relates to pulsators or alternators for milking apparatus and analogous purposes, and more particularly to pneumatically operated actuating means for automatically reversing the control valve as the pulsator valve approaches the opposite limits of its stroke.

Such pulsator devices are employed in a milking apparatus intermediate the suction or vacuum pump and the teat cup system for subjecting the teat cup inflation to intermittent atmospheric pressure and suction influence. Briefly stated, the pulsator mechanism is subjected to a constant suction or vacuum influence. It is connected through independent conduits with different teat cups of the system. By means of a reversible pulsator valve, one of the teat cup air conduits is opened to atmospheric pressure, while the other is operatively connected with the suction or vacuum means. Such interconnection of teat cup conduits is intermittently reversed by reversal of the pulsator valve. To actuate the pulsator valve there is employed a reciprocatory piston operating under atmospheric pressure from first one and then the other side of which the air is exhausted. Such exhaust is controlled by an alternating control valve. Heretofore, it has been the general practice to reverse such control valve, governing the exhaust and admission of air from and to a piston cylinder, by means of an actuating spring placed under tension by the movement of the piston, and suddenly released to effect the snap-over action as the pulsator valve approaches the limit of its stroke in either direction. Obviously such spring tension actuating means subjected the apparatus to increased resistance and interfered more or less with the free, uniform operation of the parts.

In the present construction there is contemplated pneumatic means for effecting the reversal of the piston and pulsator valve wherein a flexible diaphragm is mounted in a chamber independent of the piston cylinder and is connected through a reciprocatory link with a rock arm on the oscillatory stem of the control valve. The alternating pulsator valve not only connects the teat cup conduits with the suction or vacuum means but at the same time it connects an air duct or passage leading to one side or the other of the flexible diaphragm with such suction or vacuum means and simultaneously opens to atmospheric pressure a second air duct leading to the opposite side of such flexible diaphragm. This serves to effect a to and fro reversal of the control valve governing the admission and exhaustion of air to and from the piston cylinder in unison with the to and fro motion of the pulsator valve without however subjecting any of such parts to increased resistance or retarding their movement and without subjecting them to shock or sudden reaction incident to the snap-over action upon release of a compressed spring.

The object of the invention is to simplify the construction as well as the means and mode of operation of pulsator mechanisms, whereby they will not only be cheapened in construction, but will be more efficient in operation, uniform in action, having few parts, and unlikely to get out of repair.

A further object of the invention is to provide pneumatic actuating means for the control valve for such pulsator mechanisms, whereby such mechanism will be relieved of undue resistance and shock incident to the reaction of the usual spring actuated snap-over mechanisms.

A further object of the invention is to provide an improved mounting and actuating means for the control valve of such pulsator apparatus.

With the above primary and other incidental objects in view, as will more fully appear in the specifications, the invention consists of the features of construction, the parts and combinations thereof, and the mode of operation or their equivalent, as hereinafter described and set forth in the claims.

Referring to the accompanying drawings wherein is shown the preferred, but obviously not necessarily the only form of embodiment of the invention, Fig. 1 is a perspective view of the assembled pulsator apparatus forming the subject matter hereof. Fig. 2 is a top plan view thereof showing the pulsator and control valves at the limit of their strokes opposite those shown in Fig. 1. Fig. 3 is a top plan view of the body of the pulsator with the valves removed illustrating the relative relation of the various inlets and exhaust ports and the disposition of the air duct leading therefrom. Fig. 4 is a longitudinal sectional view of the assembled pulsator. Fig. 5 is an end elevation from the left of Fig. 4 with the terminal cap and diaphragm removed. Fig. 6 is a perspective view of the pulsator valve. Fig. 7 is a similar perspective view of the control valve. Fig. 8 is a perspective view of the valve retainer.

Like parts are indicated by similar characters of reference throughout the several views.

Referring to the accompanying drawings, 1 is the main frame or body of the pulsator having a hollow base forming the suction chamber 2 with which communicates a spud or conduit connection leading from a pump or other suction or vacuum producing apparatus. The top of the body 1 is machined flat to form a valve seat over which the pulsator and control valves operate. In this valved seat is formed a suction port 4 from which a conduit leads downward to the chamber 2. Located closely adjacent to the suction port 4 are independent ports 5 communicating with Y connections 6 to which are to be attached the flexible air conduits leading to the teat cup inflations. The air port 5 communicating with such teat cup inflation conduits are alternately connected with the suction port 4 by the to and fro motion of a pulsator valve 7 slidingly movable to and fro on the valve table 3. This pulsator valve 7 is provided on its under surface with a recess or cavity 8 of sufficient size to overlap simultaneously a suction port 4 and one or the other of the air ports 5 leading to the teat cup connection. When one of such ports 5 is covered by the valve 7 and so connected to the suction port 4, the other of the ports 5 is open to atmosphere thus permitting atmospheric pressure to enter the conduit. The under side of the pulsator valve 7 being subjected to suction or vacuum influence through the port 4, atmospheric pressure upon the top surface of the valve will hold the valve tightly and closely to its seat upon the table 3.

To alternate the pulsator valve 7 there is provided in one end of the main frame or body 1 of the pulsator, a cylinder 10 having therein a reciprocatory piston 11, the stem 12 of which extends within a bore 13 in the body of the pulsator. Connected with the piston stem 12 and extending upwardly through a slot 14 in the valve table 3 is a T-shaped stud 15 which engages loosely in a slot 16 in the under side of the pulsator valve 7. As the piston travels to and fro within the cylinder 10, it carries with it the pulsator valve 7 resting upon the valve table 3, and interconnected with the piston through the coupling stud 15 and piston stem 12.

To effect the to and fro movement of the piston 11 within the cylinder 10, there is provided in the valve table 3, a second exhaust port 18 which also communicates through a passage with the suction chamber 2 in the base of the pulsator. Located in close association with the suction port 18 are two auxiliary ports 19 from which air passages 20 and 21 lead thru the body of the pulsator 1 to opposite ends of the cylinder 10. An oscillatory control valve 22 controls the ports 18 and 19. This valve 22 has in its under side a recess or pocket 23 of sufficient size to overlap the exhaust port 18 and one or the other of the auxiliary ports 19. The other auxiliary port is simultaneously opened to atmosphere. Thus while atmospheric air may freely enter the exposed port and pass thence through the connecting air passage to one end or the other of the cylinder 10 as the case may be, air is being exhausted from the cylinder at the opposite side of the piston 11 through the other of the air connecting conduits which at such time is interconnected with the exhaust port 18 through the pocket 23. Upon reversal of the control valve 22, atmospheric air is admitted through the other of the ports 19 while air is exhausted from the opposite side of the piston 11 thereby effecting a reverse movement of such piston and with it the pulsator valve. As thus far described the construction is substantially that shown in my prior Patents No. 1,408,036 of Feb. 28, 1922, No. 1,647,971 of Nov. 1, 1927 and No. 1,681,138 of Aug. 14, 1928, and forms no part per se of the present invention. Such mechanism is here described and shown for illustrative purposes only in order that the particular invention of actuating means for the control valve 22 may be more fully and completely understood. It will be understood further that a pneumatic valve actuating means hereinafter described is applicable to pulsator mechanisms of various designs and constructions and is not limited to the specific pulsator construction shown and described with which it has been associated merely for illustrative purposes and with no intent to limit the scope of the invention.

To provide for automatic control of the valve 22 there is provided in the end of the body 1 opposite the cylinder 10 a diaphragm chamber 25 having located therein the flexible diaphragm or piston 26 dividing the chamber into two compartments. Mounted in the body 1 with its lower end projecting into such chamber 25 is a vertically disposed rock shaft 27 the upper end of which is reduced and flattened to engage a corresponding hole 27a in the under side of the oscillatory control valve 22. There is no danger of air leakage about the shaft 27. The valve 22 is of sufficient size to overlap the shaft opening on all sides and is held closely seated upon the table 3 by atmospheric pressure due to the suction or vacuum influence beneath such valve. At its lower end the rock shaft 27 carries an arm 28 having pivotal engagement with the stud or stem 29 secured to the flexible diaphragm or piston 26. As the diaphragm or piston 26 vibrates to and fro it reciprocates the stud or stem 29 which has a sliding bearing upon a concave lug 31 projecting within the chamber 25 from the body of the pulsator. The rock arm 28 being operatively connected with the reciprocatory stem or stud 29 by the engagement of its down turned end in a hole in such stud or stem, the movement of the diaphragm or piston 26 is thus transmitted to the rock shaft 27 which carries with it the control valve 22 thereby swinging the valve to and fro to alternately cover and expose the respective auxiliary ports 19. The covered port is connected by such valve with the exhaust port 18.

To effect a periodic reversal of the diaphragm or piston 26 and with it the control valve 22 there are provided in the valve table 3 and in close proximity to the ports 5—5 two air ports 32—32 interconnected by air passages through the body 1 with the compartments of the chamber 25 at opposite sides of the diaphragm 26. Such air passages are indicated in Fig. 3 at 33, and 34. The passage 34 leads through the margin of the diaphragm 26 and into a recess in the closure head of the chamber 25. The relation of the port 32 and 5 is such that the pulsator valve 7 alternately opens and closes the ports 32 simultaneously with the opening and closing of the corresponding ports 5. As a result while one of the ports 32 is connected with the suction port 4, through the overlying recess or pocket in the pulsator valve 7 thereby exhausting the air from one side of the diaphragm or piston 26, the other of the ports 32 is open to atmosphere, permitting the entrance of air and atmospheric pressure to the opposite side of the diaphragm 26. Upon reversal of the pulsator valve this relation of exhaustion and air admission is reversed. The admission of atmospheric air first to one side and then the other of the flexible diaphragm or piston 26 with the simultaneous exhaustion of air from the opposite side thereof effects an intermittent to and fro motion of the diaphragm, which, as before described, is transmitted through the stem 30 and rock shaft 27 to the oscillatory control valve 22. Inasmuch as the port 32 is uncovered only as the pulsator valve 7 approaches the limit of its stroke at which time it closes the opposite port 32, the control valve 22 remains in its operated position until the end of the pulsator valve movement, whereupon it is reversed to its opposite position thereby directing air to the opposite side of the piston 11 within the cylinder 10 to cause a reversal of such piston and thereby reverse the movement of the pulsator valve. Such pneumatic reversal of the control valve is effected smoothly and uniformly, without resistance to movement of other operating parts and with minimum expenditure of power.

The coupler member 15 interconnecting the pulsator valve 7 with the piston stem 12 is of substantially T-shape. The shank of such coupler member extends through the slot 14 with its lower end seated in a transverse hole in the piston stem 12. The lower end of such shank within the socket or hole is preferably of rectangular form and of such dimension as to pass readily through the slot 14. The portion 35 of the shank normally within the slot 14 is of cylindrical form. The transverse head portion overhangs the end of the slot 14 as the piston approaches the limit of its movement in either direction. While the rectangular lower end 36 of the shank may seat in a corresponding hole of rectangular form in the piston stem, in practice, the transverse hole in the stem 12 is circular having a diameter approximately equal to the diagonal of the rectangular portion 36 of such stem.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect and the invention is, therefore, claimed in any of its forms or modifications within the legitimate and valid scope of the appended claims.

Having thus described my invention, I claim:

1. In a pulsator mechanism, a fluid pressure operated alternating mechanism including a pulsator valve and a pivoted control valve governing the admission of actuating fluid to said mechanism, a fluid pressure operated vibratory diaphragm, an operative connection between said diaphragm and the pivoted control valve for converting the vibratory motion of the diaphragm into to and fro swinging motion of the valve and ports controlling the admission of actuating fluid to the diaphragm controlled by the pulsator valve under influence of the first mentioned mechanism.

2. In a pulsator mechanism including a pulsator valve and fluid pressure actuating means therefor of a control valve pivoted for to and fro swinging motion controlling the action of the fluid under pressure to effect intermittent reversal of the pulsator valve and vibratory fluid pressure actuated means controlled by the pulsator valve and means for converting the vibratory motion of said fluid pressure actuated means into oscillatory motion for swinging the pivoted control valve to alternate positions to control the first mentioned fluid pressure actuating means.

3. In a pulsator mechanism, a pulsator valve and actuating means for effecting periodic reversal of the pulsator valve from one position to another, a control member pivoted for to and fro swinging motion governing the actuating means, and fluid pressure operated vibratory diaphragm for actuating the swinging control member to alternate positions governed by the alternating movement of the pulsator valve.

4. In a pulsator mechanism, an alternating pulsator valve and actuating means therefor, a control member pivoted for to and fro swinging motion governing the alternating movement of the valve, and fluid pressure actuated means for swinging the control member in turn governed by the alternation of the pulsator valve.

5. In a pulsator mechanism, a cylinder, a piston therein, a pulsator valve connected with and movable to and fro in unison with the piston, said pulsator being operable to alternately open and close independent ports communicating with a distant mechanism, a control valve pivoted for to and fro swinging motion, ports controlled thereby communicating with the cylinder on opposite sides of the piston for admitting actuating fluid to and exhausting same from the cylinder, a second fluid pressure chamber, a vibratory diaphragm therein, ports leading to said chamber on opposite sides of the diaphragm alternately opened and closed by the pulsator valve in addition to said pulsator ports, for admitting actuating fluid to and exhausting same from the chamber, and an operative connection between the vibratory diaphragm and said swinging control valve for alternating said valve.

6. In a pulsator mechanism, the combination with a cylinder having independent fluid pressure chambers in its opposite ends in axial alinement with each other, a piston in one of said chambers, a pulsator valve, an operative connection between the pulsator valve and piston whereby said members move in unison, a control element pivoted for to and fro swinging motion and thereby controlling the admission and exhaustion of air alternately from the opposite sides of the piston, a vibratory diaphragm in the other of said fluid pressure chambers, said mechanism having ports for admitting fluid pressure to said chamber alternately on opposite sides of the diaphragm and controlled by the alternation of the pulsator valve and an operative connection between said diaphragm and the control element whereby said control element is alternated by the movement of the diaphragm.

7. In a pulsator mechanism, the combination with a reciprocating pulsator valve and actuating means therefor, of a control element for said pulsator valve actuating means pivoted for to and fro swinging motion, a fluid pressure chamber, an alternating actuator therein, said mechanism having ports for admitting fluid pressure to said chamber alternately on opposite sides of the actuator and controlled by the alternation of the pulsator valve, a rock shaft upon which the control element is mounted, and a rock arm carried by the shaft and operatively connected with the actuator for swinging the control element in unison with the alternating movement of the actuator.

8. In a pulsator mechanism, an alternating pulsator valve, actuating means therefor, an alternating control element governing the pulsator valve actuating means, a fluid pressure chamber, a vibratory diaphragm, a rock shaft connected with the control element, a rock arm carried thereby and connected with the diaphragm, actuating fluid being admitted to and exhausted alternately from opposite sides of the diaphragm within the chamber in unison with the alternating motion of the pulsator valve.

In testimony whereof, I have hereunto set my hand this 29th day of September A. D. 1928.

JOHN A. SCHMITT.